United States Patent [19]

Shiota et al.

[11] Patent Number: 5,681,512
[45] Date of Patent: Oct. 28, 1997

[54] PROCESS FOR PRODUCING HOMOGENEOUS PHASE MELT OF POLYACRYLONITRILE

[75] Inventors: Hirotaka Shiota, Okayama; Ryosuke Nishida, Okayama-ken; Takahisa Kida, Okayama; Noriyuki Kohara, Okayama; Yoshihiro Watanabe, Okayama; Ryuichi Kasahara, Okayama, all of Japan

[73] Assignee: Japan Exlan Company Limited, Osaka, Japan

[21] Appl. No.: 578,993

[22] Filed: Dec. 27, 1995

[30] Foreign Application Priority Data

Jan. 9, 1995 [JP] Japan ................... 7-018523

[51] Int. Cl.⁶ .................. B29B 13/06; B29C 47/36
[52] U.S. Cl. .................. 264/101; 159/2.2; 264/140; 264/169; 264/206; 264/331.16
[58] Field of Search .................. 264/101, 211, 264/140, 206, 236, 176.1, 169, 331.16, 349; 159/2.2

[56] References Cited

U.S. PATENT DOCUMENTS

| | | | |
|---|---|---|---|
| 2,847,405 | 8/1958 | Mallison | 260/80.5 |
| 3,669,919 | 6/1972 | Champ | 264/176.1 |
| 3,847,885 | 11/1974 | Peeso . | |
| 3,896,204 | 7/1975 | Goodman et al. | 264/206 |
| 3,940,405 | 2/1976 | Serad . | |
| 3,991,153 | 11/1976 | Klausner et al. | 264/211 |
| 4,049,605 | 9/1977 | Kobashi et al. | 264/211 |
| 4,062,857 | 12/1977 | Kobashi et al. | 264/206 |
| 4,108,818 | 8/1978 | Odawara et al. | 264/206 |
| 4,238,441 | 12/1980 | Cramer . | |
| 4,439,389 | 3/1984 | Hasenauer | 264/101 |
| 4,461,739 | 7/1984 | Young et al. . | |
| 4,909,898 | 3/1990 | Padliya et al. | 159/47.1 |
| 5,364,581 | 11/1994 | Wilkinson | 264/211 |

FOREIGN PATENT DOCUMENTS

| | | | |
|---|---|---|---|
| 0 223 199 | 11/1986 | European Pat. Off. . | |
| 0 355 764 | 8/1989 | European Pat. Off. . | |
| 51-7217 | 1/1976 | Japan | 264/206 |
| 51-101061 | 9/1976 | Japan | 264/206 |
| 69 307 | 5/1974 | Luxembourg . | |

Primary Examiner—Jeffery R. Thurlow
Attorney, Agent, or Firm—Wenderoth, Lind & Ponack

[57] ABSTRACT

A process for producing a homogeneous phase melt of polyacrylonitrile suitable for extrusion molding and melt spinning, by the steps of preparing polymer/water crumb containing 30–60 wt % of polyacrylonitrile and dewatering the crumb in a molten state with stirring at temperatures above 140° C. and at pressures above autogenous pressure until the concentration of the polymer in the crumb exceeds 70% by weight.

1 Claim, No Drawings

PROCESS FOR PRODUCING HOMOGENEOUS PHASE MELT OF POLYACRYLONITRILE

BACKGROUND OF THE INVENTION

1. Field of the Invention

The present invention relates to an improved process for producing a homogeneous phase melt of polyacrylonitrile and, more particularly, to an improved process for producing a homogeneous phase melt of polyacrylonitrile suitable for melt spinning and melt extrusion molding, said process comprising concentrating in molten state the polymer in the form of hydrous crumb until the concentration of the polymer in the crumb exceeds 70% by weight.

2. Description of the Prior Art

It is known that polyacrylonitrile turns into a melt upon heating in the presence of water under pressures higher than its autogenous pressure. Japanese Patent Publication No. 47283/1982 discloses a process which consists of incorporating a specific amount of water into dry polyacrylonitrile and heating the wet polymer at temperatures in a specific range, thereby forming a melt of the polymer. A disadvantage of this process is that uniform mixing of dry polyacrylonitrile with a controlled amount of water involves technical difficulties, particularly in the case where the polymer is continuously fed to the heating apparatus. Moreover, adding water to the purposely dried polymer is not desirable from the viewpoint of energy efficiency.

Japanese Patent Publication No. 39445/1984 discloses a process for preparing a melt of polyacrylonitrile by performing polymerization at temperatures above 120° C. on a monomer mixture composed mainly of acrylonitrile in the presence of water in an amount of 3–50 wt % of the monomer and water in total. A disadvantage of this process is that polymerization abruptly evolves a large amount of heat, which would make the process industrially impracticable due to difficulties in temperature control and heat removal.

SUMMARY OF THE INVENTION

It is an object of the present invention to provide an improved process for producing a high-concentration homogeneous phase melt of polyacrylonitrile suitable for melt spinning and melt extrusion molding. This process is free from difficulties in controlling water content and reaction and in scaling up. Moreover, this process is industrially advantageous because of low energy consumption and easy control.

The gist of the present invention resides in a process for producing a homogeneous phase melt of polyacrylonitrile, said process comprising forming polyacrylonitrile composed solely of acrylonitrile or mainly of acrylonitrile, with the remainder being at least one ethylenically unsaturated compound other than acrylonitrile, in the form of hydrous crumb containing the polymer in an amount of 30–60% by weight, and dewatering said hydrous crumb in molten state at temperatures above 140° C. and pressures above the autogenous pressure until the concentration of the polymer in the crumb exceeds 70% by weight.

DESCRIPTION OF THE PREFERRED EMBODIMENTS

The process of the present invention starts with forming polyacrylonitrile from which the homogeneous phase melt of polyacrylonitrile suitable for melt spinning and melt extrusion molding is prepared. The polyacrylonitrile is a homopolymer of acrylonitrile or a copolymer of acrylonitrile (more than 80 wt %, preferably more than 85 wt %) with at least one ethylenically unsaturated compound other than acrylonitrile at need. Copolymers containing less than 80 wt % of acrylonitrile are not desirable because they are poor in dye developing properties and gas barrier properties (which are characteristic of polyacrylonitrile) when used in the form of fiber or film.

Examples of the ethylenically unsaturated compounds as comonomers include acrylic acid, methacrylic acid, crotonic acid, isocrotonic acid, itaconic acid, maleic acid, masaconic acid, citraconic acid, water-soluble alkali metal and ammonium salts of these acids, allyl alcohol, methallyl alcohol, hydroxypropionacrylonitrile, methacrylonitrile, α-methyleneglutaronitrile, isopropenyl acetate, acrylamide, dimethylaminoethyl methacrylate, vinylpyridine, vinylpyrrolidone, methyl acrylate, methyl methacrylate, vinyl acetate, allyl chloride, sodium metaallylsulfonate, and potassium p-styrenesulfonate. The polyacrylonitrile may be produced in the usual way, such as aqueous suspension polymerization and emulsion polymerization. The method of polymerization is not specifically limited.

The polyacrylonitrile in the form of hydrous crumb is used as the starting material for the process of the present invention. The hydrous crumb should contain the polymer in an amount of 30–60 wt %, preferably 35–50 wt %, based on the polymer and water in total. The hydrous crumb can be easily obtained by concentrating an aqueous dispersion or emulsion of the polyacrylonitrile up to 30% or above by vacuum distillation.

Unlike a dispersion or emulsion, the hydrous crumb containing more than 30 wt % of polymer does not behave like liquid and hence cannot be concentrated any more in the usual way. (A dispersion or emulsion usually contains less than 30 wt % of polymer and resembles ordinary fluids in fluidity and transportability. It can be concentrated by ordinary vacuum distillation. Consequently, it is not significant to apply the process of the present invention to such a dispersion or emulsion.) On the other hand, the hydrous crumb containing more than 60 wt % of polymer is subject to change and deterioration due to local overheating in the subsequent heating process to produce a molten state.

The hydrous crumb melts, losing water or becoming concentrated, on heating at temperatures above 140° C. and pressures above its autogenous pressure. This step is referred to as the concentration step. Concentration can be accomplished by using any apparatus (concentrator) equipped with a heating source, temperature control, and pressure control. Preferred examples of the concentrator include "Advanced Reactor" (high viscous fluid reactor stirring machine) and "Bivolak" (surface renewal type reactor stirring machine), both made by Sumitomo Heavy Industries, Ltd.

This concentration step should be carried out under pressure at temperatures above 140° C. Below this temperature, the polyacrylonitrile does not melt and hence does not give rise to the homogeneous phase melt for which the present invention is intended. Although there is no upper limit specifically, temperatures ranging from 150° C. to 180° C. are desirable from the standpoint of energy saving and avoiding the polymer's discoloration and deterioration.

In addition to temperature mentioned above, pressure is another factor that affects the concentration step. In other words, concentration should be carried out at pressures above the autogenous pressure of the hydrous crumb, which is the saturated vapor pressure exerted by the hydrous crumb in the concentration step. It is approximately equivalent to the saturated vapor pressure of water as a solvent, although it varies depending on the concentration of the polymer (as dispersoid) and dissolved impurities. It is usually 4 kg/cm$^2$ at 140° C. and 10 kg/cm$^2$ at 180° C.

Concentration at pressures lower than the autogenous pressure permits water (as a dispersing medium) to boil, making it impossible to maintain the desired temperature, with the result that the polymer is not melted and the homogeneous phase melt is not obtained as intended in the present invention.

According to the present invention, the concentration step involves dewatering. Dewatering is the removal from the system of water in the form of steam evolved at the above-specified temperature and pressure. Without dewatering, it is impossible to increase the concentration of the polymer as intended in the present invention. Dewatering may be accomplished by discharging steam from the system through a small hole formed in the upper wall of the vessel which is in contact with the vapor phase. The discharging of steam may be accelerated by introducing a carrier medium (such as air and nitrogen) into the vapor phase or liquid phase.

Dewatering should be carried out until the polymer concentration in the melt exceeds 70 wt %. With a polymer concentration lower than 70 wt %, the resulting melt may not form the homogeneous phase. Such a melt is poor in spinnable properties and yields products of low quality, because it contains the polymer and water which form their own liquid phases separately. In other words, it appears to be a melt as a whole but in actual it is not homogeneous. The "homogeneous phase" as used in this invention denotes the state in which there are no more than one phase visible to the naked eyes.

Dewatering may be properly controlled by monitoring the flow rate of steam being discharged or the amount of condensate collected. In this way it is possible to produce a highly concentrated, homogeneous phase melt of polyacrylonitrile suitable for extrusion molding and melt spinning.

Although the foregoing explanation applies to the batchwise operation, the process of the present invention can be carried out batchwise as well as continuously. A continuous operation may be accomplished by passing the hydrous crumb through a heated pipe of adequate length. During passage through the pipe, the hydrous crumb is heated to a prescribed temperature for melting. The melt is introduced into a heated pressurized tank, in which water is allowed to evaporate. Steam is discharged from the upper part of the tank and the homogeneous phase melt is continuously discharged from the lower part of the tank. Dewatering may be controlled by monitoring the level of the melt in the tank, assuming a constant feeding and discharging rate.

The invention will be described in more detail with reference to the following examples, in which "%" and "parts" are based on weight.

EXAMPLE 1

A monomer mixture was prepared from 90 parts of acrylonitrile and 10 parts of methyl acrylate. This monomer mixture underwent suspension polymerization (in water) by the aid of ammonium sulfate as an initiator. Thus there was obtained an aqueous dispersion of polyacrylonitrile composed of 30 parts of polyacrylonitrile and 70 parts of water. This dispersion was filtered through No. 5 filter paper. The thus obtained hydrous crumb was dried or incorporated with water to give polymer-water mixtures containing the polymer in varied amounts of 30, 40, 50, 60, and 65 wt %.

Each of these mixtures was heated with stirring to 160° C. in a 300-ml glass autoclave. The pressure in the autoclave reached about 6 kg/cm$^2$. With the temperature and pressure kept at 160° C. and 6.5 kg/cm$^2$, steam was allowed to escape through the upper discharge cock of the autoclave.

The discharged steam was passed through a cooling pipe for condensation, and the condensate was collected in a measuring cylinder. The discharging of steam was continued until the polymer concentration in the autoclave reached about 80 wt %, which was calculated from the amount of water collected. Then, heating was suspended, and the autoclave was allowed to cool. After cooling, the autoclave was depressurized and emptied. There were obtained five samples which assumed the appearance and color as shown in Table 1 below.

TABLE 1

| Sample No. | Concentration of polymer charged | Appearance and color of products |
|---|---|---|
| 1 | 30% | Lump of polymer in homogeneous phase, light yellow |
| 2 | 40% | Lump of polymer in homogeneous phase, light yellow |
| 3 | 50% | Lump of polymer in homogeneous phase, light yellow |
| 4 | 60% | Lump of polymer in homogeneous phase, yellow |
| 5 | 65% | Lump of polymer in homogeneous phase, partly brown |

The fact that the samples were lumps of polymer in homogeneous phase (containing 18% water) suggests that the heating yielded a homogeneous phase melt of polyacrylonitrile in the autoclave. However, the resulting polymer is appreciably discolored in the case where the concentration of polymer charged exceeds 60 wt %.

EXAMPLE 2

A sample of hydrous crumb containing 40 wt % of polyacrylonitrile was prepared in the same manner as in Example 1. This hydrous crumb (1500 g) was charged into a 2000-ml stainless steel autoclave equipped with a valved die (0.5 mm in diameter) at the bottom. The hydrous crumb was heated in the same manner as in Example 1 until 710 ml of water was removed. The resulting product in the autoclave was a homogeneous phase melt containing 76 wt % polymer. With the temperature and pressure kept at 160° C. and 6.5 kg/cm$^2$ opening the bottom discharge cock of the autoclave, the polymer melt was continuously discharged through the die. There was obtained polyacrylonitrile in transparent homogeneous phase in the form of rod about 1 mm in diameter.

EXAMPLE 3

A monomer mixture was prepared from 88 parts of acrylonitrile and 12 parts of methyl methacrylate. This monomer mixture underwent suspension polymerization (in water) by the aid of azobisisobutyronitrile as an initiator. Thus there was obtained an aqueous dispersion of polyacrylonitrile composed of 25 parts of polyacrylonitrile and 75 parts of water. This dispersion was filtered and dewatered under reduced pressure to give a sample of crumb containing 45% polymer. The thus obtained hydrous crumb was continuously fed to a surface renewal type reactor stirring machine ("Bivolak" from Sumitomo Heavy Industries, Ltd.) for dewatering by replacement with nitrogen, with the saturated vapor pressure in the reactor kept at 165° C. and 7.2 kg/cm². Thus there was obtained continuously a homogeneous phase melt of polyacrylonitrile containing 20% water. The melt was extruded by a gear pump from the reactor into the atmosphere through a spinneret having 500 holes, each 0.1 mm in diameter. Continuous stable extrusion gave transparent dense filaments.

COMPARATIVE EXAMPLE 1

A sample (200 g) of the polymer-water mixture containing 30 wt % polymer obtained in Example 1 was charged into the autoclave and dewatered in the same manner as in Example 1 except that the temperature and pressure were changed to 135° C. and 3.2 kg/cm². When the amount of distillate (water) collected in the measuring cylinder reached 50 ml, it became difficult to continue stirring due to increased torque. It was found that the contents of the autoclave were a mere translucent dispersion of solid polymer particles. Heating was suspended and the autoclave was allowed to cool. After cooling, the autoclave was depressurized and emptied. The resulting product was a pasty mixture of polymer particles and water, containing 40 wt % polymer. In other words, there was not obtained a homogeneous phase polymer lump. It was shown that the desired homogeneous phase melt of polymer is not obtained if dewatering is performed at a temperature which is not high enough to produce the autogenous pressure.

As demonstrated above, the process of the present invention offers the advantage of omitting the steps of drying polyacrylonitrile and mixing it with water (which the prior art technology needed to control the polymer-to-water ratio), thereby greatly saving energy required to prepare the homogeneous phase melt of polyacrylonitrile, carrying out the steps of producing polyacrylonitrile and forming its melt without interruption, thereby minimizing the fluctuation of the melt composition, and permitting polyacrylonitrile moldings and fibers of uniform quality to be formed from the homogeneous phase melt of polyacrylonitrile.

Another advantage of the present invention stems from the fact the step of concentration is carried out at temperatures above 140° C. and at pressures above the autogenous pressure. Under this condition, the polyacrylonitrile melts and becomes fluid owing to the plasticizing action of water contained therein. Polyacrylonitrile in the form of fluid melt is by far easier to handle (for transportation etc.) than that in the form of powder or paste. Therefore, the homogeneous phase melt of polyacrylonitrile in high concentration is suitable for extrusion molding and melt spinning. According to the present invention, it can be produced easily with a less amount of energy on an industrial scale.

What is claimed is:

1. A process for producing a homogeneous phase melt of polyacrylonitrile, said process consisting essentially of forming a polymer/water crumb containing 30 to 60% by weight of polyacrylonitrile homopolymer or polyacrylonitrile copolymer of 80 weight percent or more of acrylonitrile, the remainder being at least one ethylenically unsaturated polymer other than acrylonitrile, and dewatering said polymer/water crumb in a molten state with stirring at temperatures above 140° C. and pressures above autogenous, until the concentration of the polymer in the polymer/water crumb exceeds 70 percent by weight.

* * * * *